United States Patent [19]

Ogasawara

[11] Patent Number: 5,455,494
[45] Date of Patent: Oct. 3, 1995

[54] METHOD FOR CONTROLLING A LUMBAR SUPPORT DEVICE IN A POWERED SEAT AND MOTOR CONTROL DEVICE PROVIDED THEREIN IN ASSOCIATION THEREWITH

[75] Inventor: Hiromitsu Ogasawara, Ohme, Japan

[73] Assignee: Tachi-S Co., Ltd., Tokyo, Japan

[21] Appl. No.: 51,213

[22] Filed: Apr. 23, 1993

[51] Int. Cl.⁶ ......................................... H02P 1/22
[52] U.S. Cl. .................. 318/267; 318/466; 297/284.4; 297/DIG. 3
[58] Field of Search ................... 297/284.4, 284.6, 297/284.9, DIG. 3, 217; 318/467, 590, 265, 466, 266, 468

[56] References Cited

U.S. PATENT DOCUMENTS

| | | | |
|---|---|---|---|
| 4,425,910 | 1/1984 | Meiller | 297/284.4 |
| 4,981,131 | 1/1991 | Hazard | 297/DIG. 3 |
| 5,065,079 | 11/1991 | Ogasawara | 318/281 |
| 5,155,685 | 10/1992 | Kishi et al. | 318/467 |

*Primary Examiner*—John W. Cabeca
*Attorney, Agent, or Firm*—Browdy and Neimark

[57] ABSTRACT

A method and device for controlling a lumbar support device, wherein a motor is controlled its drive under a repeated reversal drive operation to provide a fore-and-aft reciprocation of a lumbar plate within a predetermined operation time in a periodic way, so as to provide a massage effect to the lumbar part of an occupant on the seat. A manual control mode for giving a static lumbar support and in addition thereto, an automatic control mode for giving a dynamic lumbar support to the occupant's lumbar part.

21 Claims, 9 Drawing Sheets

METHOD FOR CONTROLLING A LUMBAR SUPPORT DEVICE IN A POWERED SEAT AND MOTOR CONTROL DEVICE PROVIDED THEREIN IN ASSOCIATION THEREWITH

BACKGROUND OF INVENTION

1. Field of Invention

The present invention relates to a lumbar support device provided in a powered seat of an automobile, and is particularly directed to a method for controlling the lumbar support device under a motor control so as to adjust the fore-and-aft position of the same for proper support of the lumbar portion of an occupant on the seat and a motor control device provided in the seat in association with such method.

2. Description of Prior Art

In automotive seats, it is well known that a lumbar support device is provided in some of them as a means for giving a proper support to a lumbar part of an occupant sitting on the seat, with a view to making stable his or her seating posture and protecting him her against a fatigue developed from a long period of seating in the seat. The lumbar support device is designed to cause movement of a lumbar support plate which gives a pressure support to the occupant's lumbar part. The control of such lumbar support plate (for the fore-and-aft movement of the same) is typically made through control of associated motor by manual switch operations.

In connection with the lumbar support, it has been found from the recent experiments and researches that the spine or vertebra of a person who sits on a seat with the smallest fatigue represents an inverted "S" shape, which has led us to presume that a deformmation of such inverted-S-shaped vertebra appears to create a fatigue or tired feeling in the person on the seat. It is therefore through that the fatigue or tired sense originates from a muscular fatigue which arises from an uneven force distribution of the persons's muscle due to the foregoing deformation of inverted "S" shape of vertebra.

With this diagnostic aspect in view, most of known lumbar support devices are so designed that its lumbar support plate may be adjusted in support force against the person's lumbar part such as to keep his or her vertebra in that ideal inverted "S" shape in order to alleviate the fatigue. However, the hitherto lumbar support plate does not take into account the fact that a long period of sitting on a seat leads soon to the muscular fatigue of passenger thereon and consequently the passenger changes his or her seating posture, encountering again the deformation of vertebra from the inverted "S" shape and thus suffering from the foregoing fatigue problem. The reason is that, according to this known device, the lumbar support plate, which contacts the back of passenger, is normally kept stationary and applies a predetermined support force, constantly, to that back portion or lumbar part of passenger at a given pressure amount for attaining the ideal inverted "S" shape of vertebra. In other words, the device merely gives such support force to the passenger's back, and the passenger is forced to be restrained under such fixed conditions, which results in causing easy creation of the muscular fatigue on the contrary and does not attain the vertebra's inverted "S" shape properly depending upon the seating state of the passenger on the seat.

SUMMARY OF THE INVENTION

In view of the above-stated drawbacks, it is therefore a purpose of the present invention to provide an improved method and device for controlling a lumbar support device which is more effective in alleviating the fatigue in the lumbar part of an occupant on the seat.

In order to achieve such purpose, in accordance with the present invention, there is basically provided a method comprising the steps of:

(a) permitting a manual mode for controlling drive of said motor to adjust the fore-and-aft position of said lumbar plate so as to give a static or stationary support to a lumbar part of an occupant sitting on the seat under a predetermined lumbar support force; and in addition thereto, (b) permitting an automatic mode for effecting repeated reversal drive of said motor so as to cause fore-and-aft reciprocating motion of said lumbar plate within a predetermined range of the reciprocation for a predetermined period of time in a periodic manner, thereby providing a dynamic or moving support to the lumbar part of occupant sitting on the seat.

In one aspect of the invention, a time for keeping still the lumbar plate may be set in each of a forward reciprocation limit and a backward reciprocation limit and such time may be divided into a desired plurality different times, in which case, a selection switch may be provided to select one of those plural times.

Further, in another aspect of the invention, the abovementioned automatic mode may be effected by operation of an automatic switch, and the automatic switch may include an interval switch for effecting an interval operation which causes repeated reversal drive of a motor to provide one cycle of fore-and-aft reciprocation operations of a lumbar support plate with a given interval of pause, during which the lumbar plate reciprocation is to be effected at a number of times with such pauses.

It is a second purpose of the invention to provide a device for carrying out the above-stated method.

To this end, the device basically comprises a motor for causing the fore-and-aft movement of lumbar plate, a switch means for controlling the motor under the manual control mode to adjust the position of the lumbar plate, an automatic switch means for executing the automatic control mode, a detecting means for detecting the position of lumbar plate, and central processing unit. In this arrangement, the foregoing selection and interval switches may be provided for their respective purposes.

DETAILED DESCRIPTION OF PREFERRED EMBODIMENTS OF THE INVENTION

Figure 1:
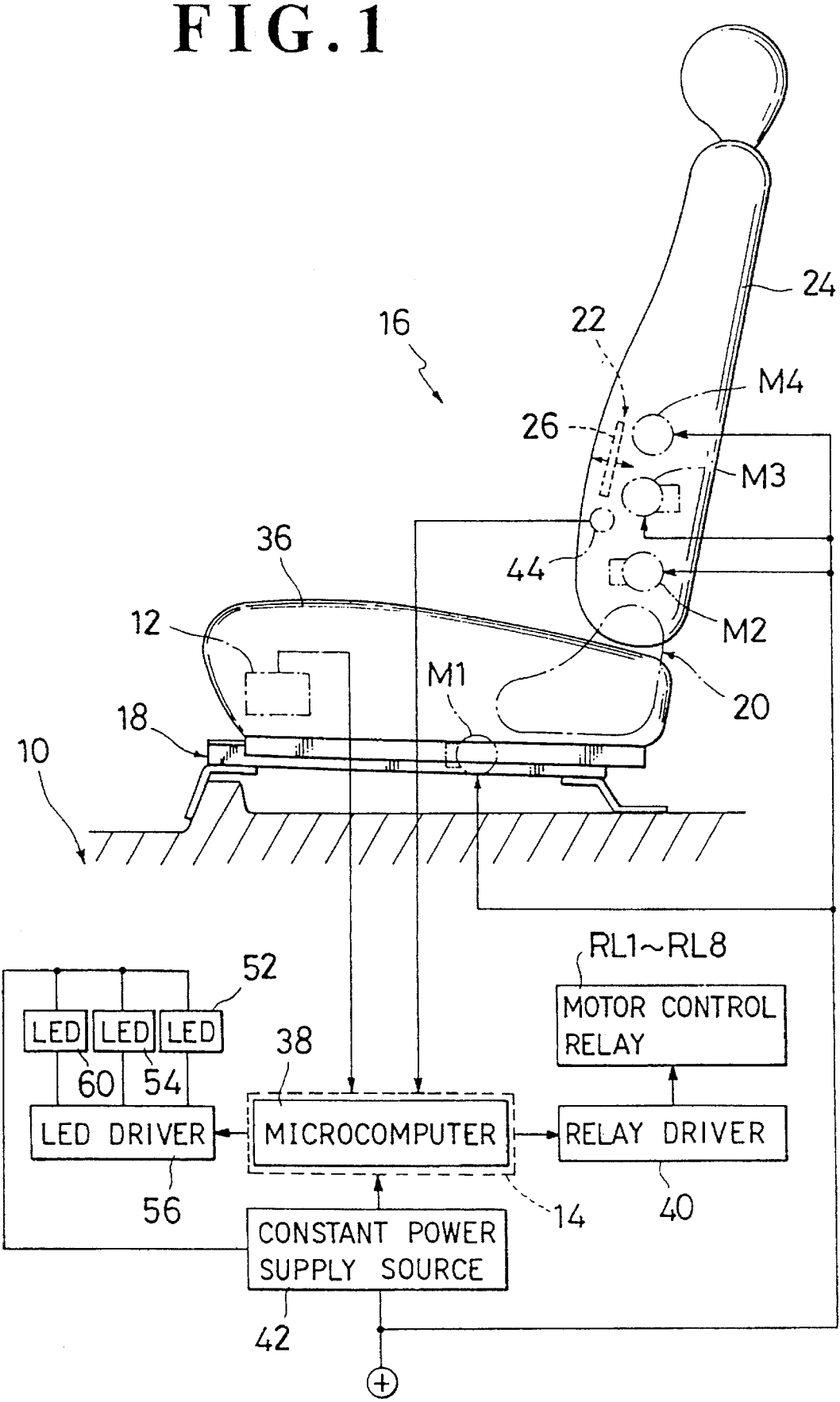
FIG. 1 is a block diagram of a lumbar support device control system in the present invention.
Figure 2:
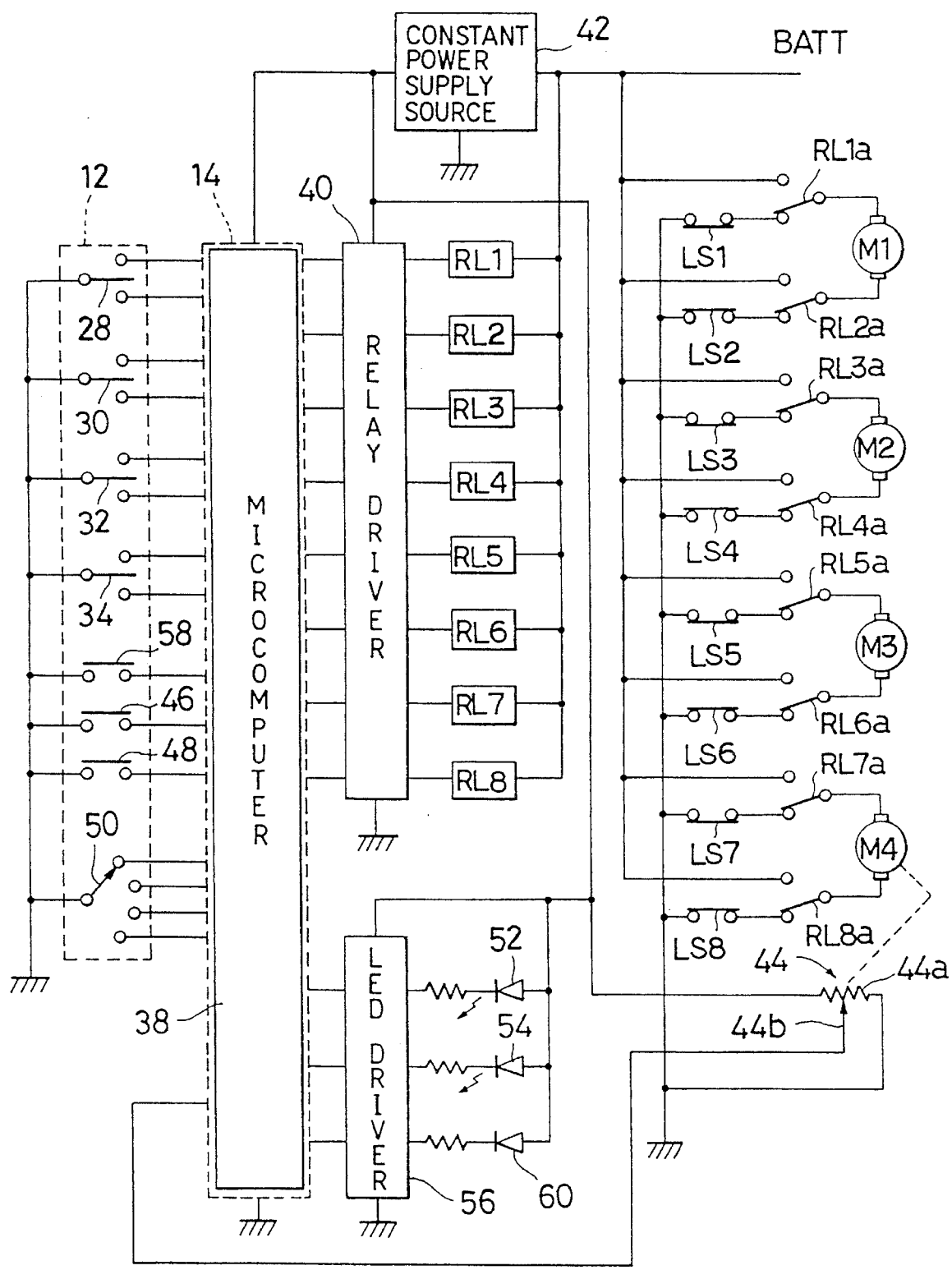
FIG. 2 is a circuit diagram for the system.

As shown in FIGS. 1 and 2, a motor control device (10) for a powered seat in accordance with the present invention comprises of an operation switch (12), a central processing unit (14) (referred to as "CPU" hereinafter), relays (40, RL1 to RL8, RL1a to RL8a) and first to fourth motors (M1, M2, M3, M4).

Designation (16) in FIG. 1 denotes a powered automotive seat composed of a seat back (24) and a seat cushion (36). Designation (22) represents a lumbar support device, to which the present invention is particularly directed.

The four motors (M1), (M2), (M3) and (M4) are DC geared motors. The first and second motors (M1) (M2) are adapted to actuate a seat slide device (18) and a reclining device (2), respectively. The third and fourth motors (M3), (M4) are associated with the lumbar support device (22). The former (M3) being adapted to actuate a lumbar plate vertical drive mechanism (not shown) for causing vertical movement of a lumbar plate (26) within the seat back (24), and the latter (M4) being adapted to actuate a lumbar plate fore-and-aft drive mechanism (not shown) for causing the lumbar plate (26) to move forwardly and backwardly of the seat back (24).

In brief, as understandable from FIGS. 1 and 2, the first motor (M1) is controlled to adjust the fore-and-aft position of seat (16) by operating a switch (28) through a seat slide device (12), related relays (RL1, RL1a)(RL2, RL2a), forward limit switch (LS1) and backward limit switch (LS2). The second motor (M2) is controlled to adjust the reclining angle of seat back (24) by operation of a switch (30) through a reclining device (20), related relays (RL3, RL3a) (RL4, RL4a), forward reclining angle limit switch (LS3) and backward reclining angle limit switch (LS4).

Those first and second motors (M1)(M2) are further properly controlled by the CPU having a microcomputer (38) and relay driver (40). The CPU (14) and relay driver (40) is connected electrically to a constant power supply source (42) and battery (BATT).

The CPU (14) processes input data according to a preset program and outputs a proper control signal to the relay driver (40) in order to provide an appropriate control over all the motors (M1)(M2)(M3) (M4).

Designations (32) and (34) in FIG. 2 refer to a lumbar vertical adjustment manual switch and a lumbar fore-and-aft adjustment manual switch, respectively.

As understandable from FIG. 2, operating the former switch (32) leads the CPU (14) to output a control signal to the relay driver (40) which activates one of the two relays (RL5)(RL6) to switch over the associated one of relay contacts (RL5a)(RL6a) so as to drive the motor (M3) in the normal or reverse direction. The normal drive of motor (M3) causes upward movement of the lumbar plate (26), and reverse drive of same causes the lumbar plate (26) to move downwardly. Operating the switch (34) results in one of two related relays (RL7)(RL8) switching over the associated one of relay contacts (RL5a)(RL6a) though the CPU (14) and relay driver (40), so as to drive the motor (M4) in the normal or reverse direction, thereby causing forward or backward movement of the lumbar plate (26).

Figure 3:
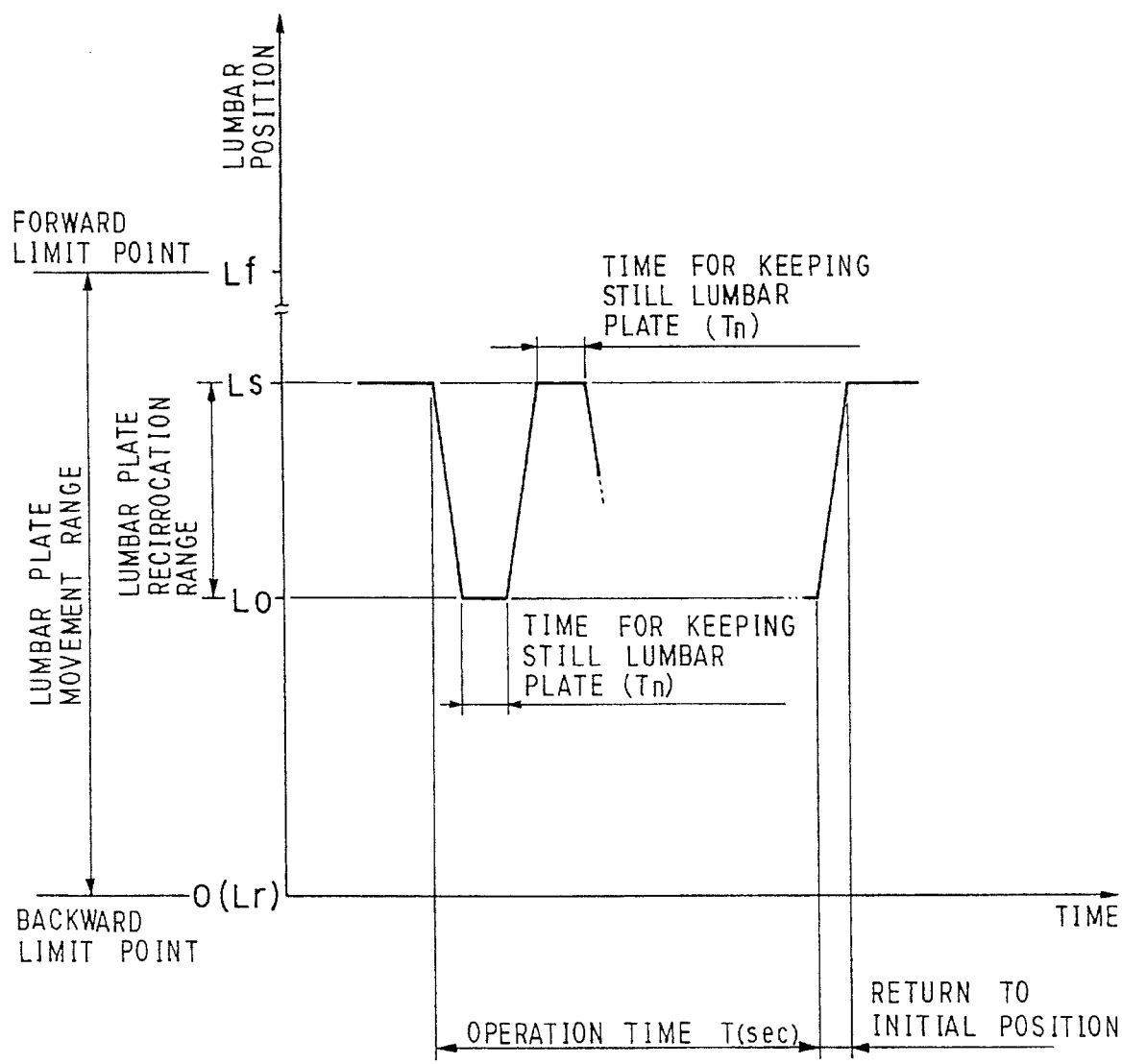
FIG. 3 is a time chart for controlling the fore-and-aft reciprocation of a lumbar plate.

In the present control device (10), a lumbar fore-and-aft position detector (44) is provided to detect a position of the lumbar plate (26) in the fore-and-aft direction. The detector (44) may be a potentiometer (a sort of variable resistor), which has a fixed resistor element (44a) and a movable terminal (44b) in a slidable contact therewith. The movable terminal (44b) is moved by the drive of motor (M4) to vary a resistance value, detecting thus the fore-and-aft position of the lumbar plate (26). Further, the movable terminal (44b) is electrically connected to the CPU (14). CPU (14) counts a movement amount of the lumbar plate (26), on the basis of the resistance value of potentiometer (44), in reference to a preset standard value. The standard value may be set, based upon one of forward limit point (Lf) and backward limit point (Lr) in a predetermined movement range of the lumbar plate (26) as shown in FIG. 3. In the present embodiment, the backward limit point (Lr) is set as such standard value or standard position point. The potentiometer (44) is not limited to the illustrated one, but may be any other suitable one, such as a rotation sensor for detecting the lumbar plate position from the number of rotation of the motor (M4).

In accordance with the present invention, the fourth motor (M4) is controlled to repeat reversing its rotation between the normal and reverse direction for a predetermined period time so as to cause repeating forward and backward movement of the lumbar plate (26) within a given range. In this particular embodiment, such repeated reversing drive of motor (M4) may be effected for 30 sec. or 60 sec. The CPU (14) stores such two selectable reversing drive time in memory. For that purpose, as shown in FIG. 2 in the operation switch unit (12), there are two automatic switches (46) and (48) of self-return push type which are both connected with the CPU (14). The first automatic switch (46) is operable to effect the 30-sec. repeated reversing drive and the second one (48) is operable to effect the 60-sec. repeated reversing drive, with respect to the motor (M4), so that an occupant on the seat (16) can select one of those two times for such fore-and-aft reciprocation of lumbar plate (26).

In such automatic mode, as shown in FIG. 3, the range within which to effect the fore-and-aft reciprocation of lumbar plate (26) is defined between a forward reciprocation limit (Ls) and a backward reciprocation limit (Lo). Both forward and backward reciprocation limits (Ls)(Lo) are preset at desired position by manual operation of the motor (M4). The forward reciprocation limit (Ls) is defined to be an original limit point of the lumbar plate (26).

In this respect, it has been found that the above-stated forward reciprocation limit (Ls) may be an optimal position of the lumbar plate (26) for giving a most comfortable force to the lumbar part of an occupant on the seat (26), and a slight backward displacement of the lumbar plate (26) from such forward limit (Ls) suffices in reducing the lumbar support force of the lumbar plate (26) to such a degree that the occupant does not feel the lumbar support touch. Hence, in the present invention, the point of such slight backward movement of lumbar plate (26) is set to be the limit point "Lo" in FIG. 3.

As in the FIG. 3, the backward reciprocation limit (Lo) may be set at a point occupying a certain ratio in the distance between the backward limit point (Lr) and forward reciprocation limit (Ls). Since the backward limit point (Lr) forms a standard position, that the backward reciprocation limit (Lo) is set at a point occupying 60% of distance from the standard position (Lr). It may be arranged, for instance, such that the CPU (14) counts out the same limit (Lo) on the basis of the following formula: Lo=Ls×0.6. This means that the fore-and-aft reciprocation range of lumbar plate (26) is limited to 40% in the distance between the original position (Ls) and standard position (Lr.).

Now, if one of the automatic switches (46)(47) is operated, the CPU (14) reads the original position (LS) which has been set under a manual mode, and counts up the backward reciprocation limit (Lo) under the formula, Lo=Ls×0.6, and executes a repeated energizing/deenergizing operation for the relays (RL7) (RL8) to effect on-off control of the motor (M4), whereby the lumbar plate (26) is subject to the fore-and-aft reciprocating movement between the forward and backward reciprocation limits (Ls)(Lo), for an operation time (T) selected by one of the automatic switches (46)(48).

Accordingly, it is appreciated that the fore-and-aft reciprocation of lumbar plate (26) provides a massage effect to the lumbar part of an occupant on the seat, and additionally, as the lumbar plate (26) presses repeatedly against the occupant's lumbar part at the fixed forward limit (Ls), the occupant can retain the ideal inverted-S-shaped spine state for a long period of time, and therefore alleviate a fatigue developing from a long-time seating posture in the seat.

It is also appreciated that the 40% limitation of the lumbar plate fore-and-aft reciprocation range between the forward and backward limit points (Lf)(Lr) is effective not only in preventing an overrun of the lumbar plate (26), but also in achieving a rapid reciprocating motion of the same, in the automatic mode.

Referring to FIG. 3, in the present invention, a certain time (Tn) in which the motion of the lumbar plate (26) pauses is given in each of the forward and backward reciprocation limits (Ls)(Lo). The CPU (14) instructs the motor (M4) to stop its drive for that time to keep still the lumbar plate (26) at each of the forward and backward reciprocation limits (Ls)(Lo). It may be possible to set a desired number of such time as Tn, and also a desired length of each of the time (Tn) can be set by operation of a selection switch (50), according to the occupant's own taste and fatigue degree. The selection switch (50) may be a dip rotary switch or the like, which has a movable contact for selective contact with one of plural fixed contact points, as indicated in FIG. 2, by which a desired code signal can be output. As shown in the Table 1, below the selection switch (50), for example, may have nine switch positions (0 to 9) (i.e. nine fixed contact points), each having different code signal to be output for setting a length of the foregoing time (Tn) for keeping still the lumbar plate (26). Thus, operating the switch (50) permits for selecting a desired one of the nine different times (Tn) as in the Table 1 below. The CPU (14) has a timer (not shown) for counting each of those times.

TABLE 1

| Switch Position | Code Signals | | | | Time for Keeping Still the Lumbar Plate (26) (sec.) |
|---|---|---|---|---|---|
| | 1 | 2 | 4 | 8 | |
| 0 | | | | | 0.2 |
| 1 | ● | | | | 0.4 |
| 2 | | ● | | | 0.6 |
| 3 | ● | ● | | | 0.8 |
| 4 | | | ● | | 1.0 |
| 5 | ● | | ● | | 1.2 |

TABLE 1-continued

| Switch Position | Code Signals | | | | Time for Keeping Still the Lumbar Plate (26) (sec.) |
|---|---|---|---|---|---|
| | 1 | 2 | 4 | 8 | |
| 6 | | ● | ● | | 1.4 |
| 7 | ● | ● | ● | | 1.6 |
| 8 | | | | ● | 1.8 |
| 9 | ● | | | ● | 2.0 |

A first automatic mode LED indicator (52) and a second automatic mode LED indicator (54) are provided as shown in FIG. 1 to notice the state where the above-stated lumbar plate reciprocation is being done in the automatic mode. The former (52) and latter (54) indicate the 30-sec. and 60-sec. operation times, respectively, for one stroke of such automatic-mode reciprocation of lumbar plate (26).

After the reciprocation operation in the automatic mode, the lumbar plate (26) is automatically returned to an initial position corresponding to the original position (Ls). In this regard, the original position (Ls) has been stored in the memory of CPU (14) on the basis of a value input from the potentiometer (44), and then, at the completion of such lumbar plate reciprocation operation, the CPU (14) compares the present position of the lumbar plate (26) with the original position (Ls) so as to count out an amount of fore-and-aft movement of the lumbar plate (26) and work the motor (M4) to drive for returning the lumbar plate (26) to the position corresponding to the original position.

The aforementioned time, 30 sec. and 60 sec., is timed by an operation timer provided in the CPU (14).

Figure 4:
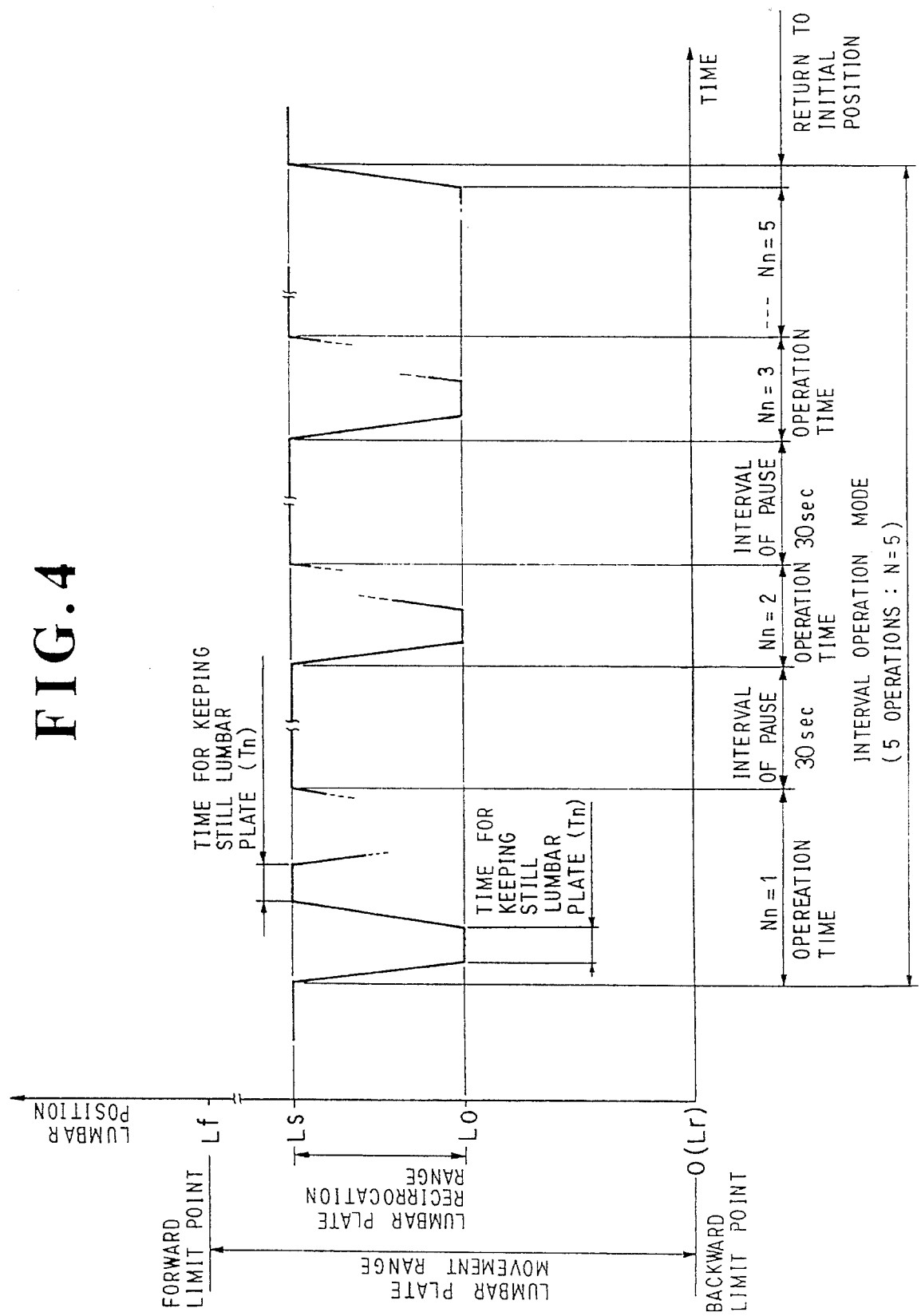
FIG. 4 is a time chart for controlling the interval operation of such fore-and-aft lumbar plate reciprocation.

In accordance with the present invention, as shown in FIG. 4, there is provided an interval operation mode which can be effected to repeat the above-described lumbar plate fore-and-aft reciprocating motion with an interval of pause, at a predetermined time(s). According to the embodiment of FIG. 4, the interval of pause is 30 sec. and in one set of interval operation, one stroke of fore-and-aft reciprocating of the lumbar plate (26) is repeated five times. A counter (not shown) provided in the CPU (14) checks on how many times such one set of checks on how many times such one set of such interval operation is carried out, and a pause timer (see t0 in FIG. 8 for example). This interval operation is controlled by operation of an interval switch (58). The interval switch (58) may be a self-return push type as in FIG. 2, which is connected with the CPU (14). An interval LED indicator (60) is provided to notice the state where the interval operation is being done, and so arrange that it lights on when turning on the interval switch (58) and keeps lighting until one set of the interval operation is completed.

In this interval operation, as similar to the automatic control mode, at the completion of the operation, the lumbar plate (26) is automatically returned to a position corresponding to the original position.

Now, with reference to FIGS. 3 to 10, description will be made of the method for effecting the control of lumbar plate in the automatic control mode.

Figure 5:
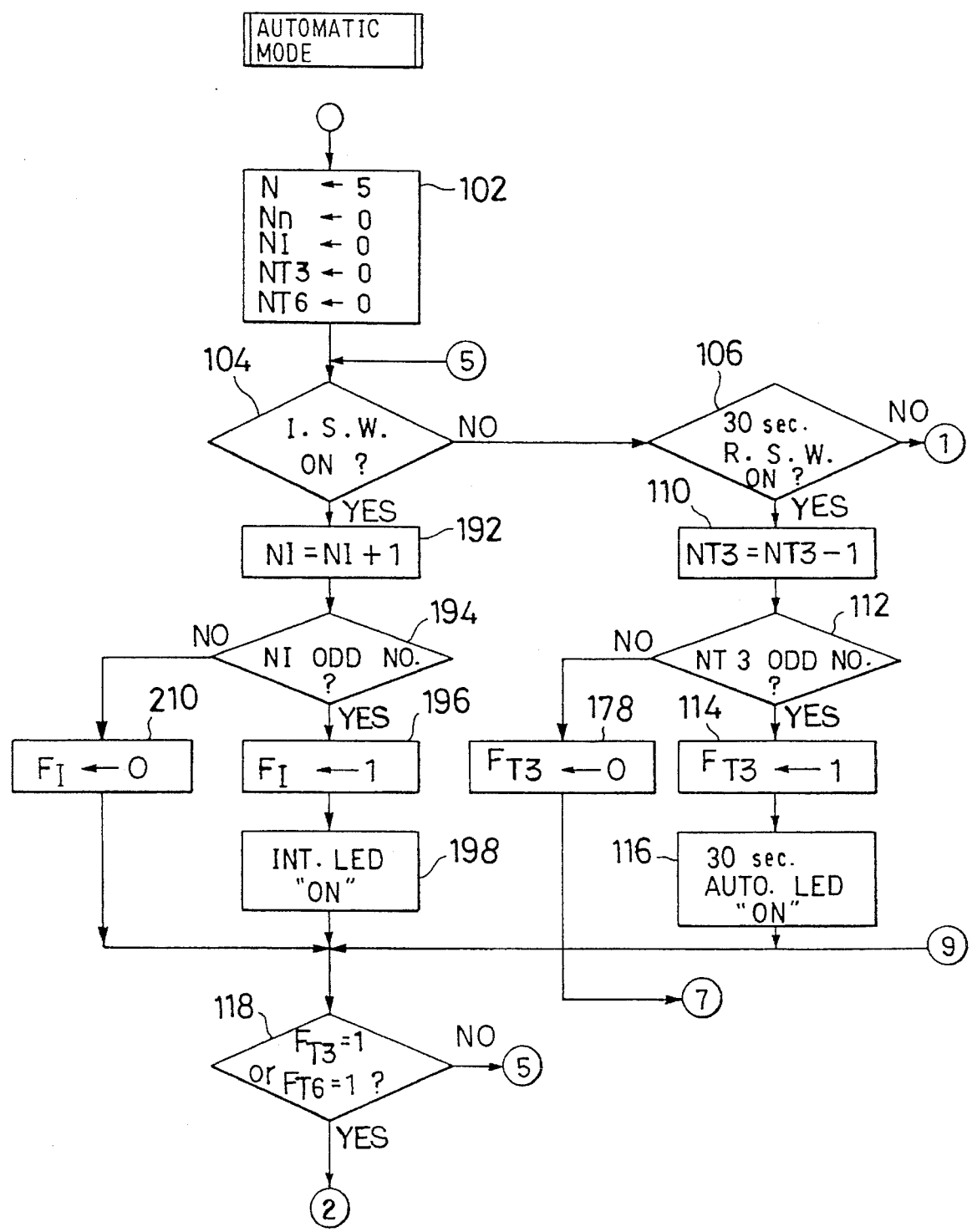
FIG. 5 is a flow chart for the steps associated with an automatic control mode.
Figure 6:
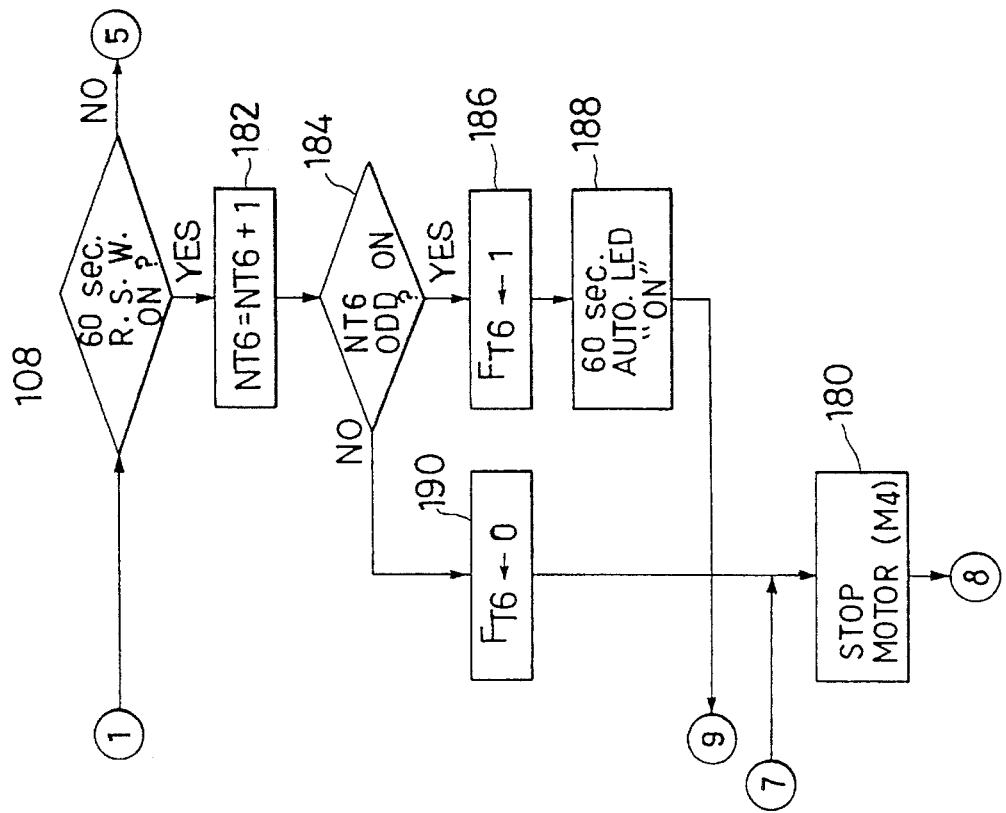
FIG. 6 is a flow chart associated with a 60-sec. reciprocation operation.

Firstly, as shown in FIG. 5, the setting value (N) for the interval operation is set to be "5" as an initial value, while the interval operation number value (Nn), the interval operation value (NI), the 30-sec. reciprocation value (NT3) and the 60-sec. reciprocation value (NT6) are set to be "0" as an initial value at (102). Then, as shown in FIGS. 5 and 6, it is determined whether or not the interval switch (58) is "ON" or not at (104), whether or not the 30-sec. reciprocation switch (46) is "ON" or not at (106), and whether or not the 60-sec. reciprocation switch (48) is "ON" or not at (108). The motor (M4) is controlled its drive in response to any of those three switches.

Figure 7:
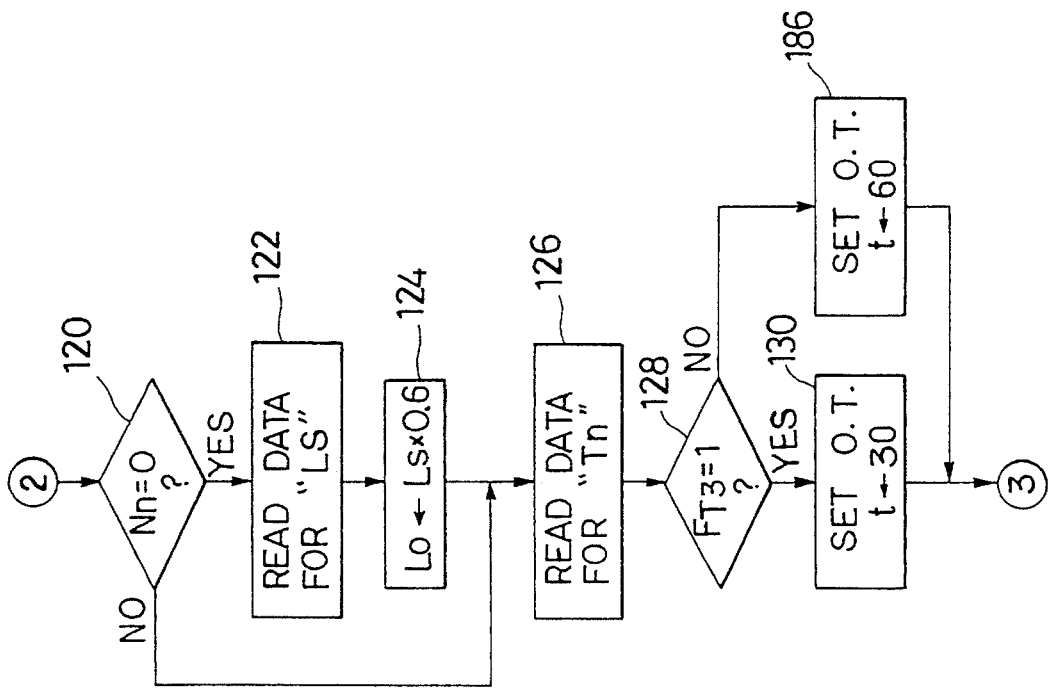
FIG. 7 is a flow chart for detecting the range of the fore-and-aft reciprocation of lumbar plate.

Assuming now that the 30-sec. reciprocation switch (46) is operated, with the lumbar plate (26) located at the position (Ls) shown in FIG. 3, the negative decision "NO" is given at (104) and the affirmative decision "YES" is given at (106) in FIG. 5. Then, at (110), the numeral "1" is added to the operation value (NT3), and it is determined whether the value (NT3) is an odd number or not at (112). In this case, the number "1" is added to the initial value "0", whereupon the operation value (NT3) is "1", an odd number. Thus, "YES" is decided and a flag for the 30-sec. reciprocation switch operation is set to be "1" at the block (114). The corresponding automatic LED indicator (52) lights on, as at the block (116). Then, at the block (118), it is determined whether or not one of the 30-sec. and 60-sec. reciprocation switch operation flags (FT3)(FT6) is set to be "1"; namely, whether or not one of the two automatic switches (46)(48) is operated. Here, since the flag (FT3) is set to be "1" due to the 30-sec. reciprocation switch (46) being operated, the answer "YES" is given there, and as shown in FIG. 7, it is decided, at (120), whether the interval operation number value (Nn) is set to be "0", or not. Naturally, in this instance, such value (Nn) remains set to be "0", so that "YES" is given at (120). At the next block (122), the CPU (14) reads the original position (Ls) of the lumbar plate (26) and further counts out the backward reciprocation limit (Lo) on the basis of the aforementioned formula, Lo=Ls×0.6, at (124). In other words, in those two blocks (122)(124), the forward and backward reciprocation limits (Ls)(Lo) is defined, which limits the range within which the lumbar plate (26) reciprocates in the fore-and-aft direction. (see FIG. 3)

Figure 8:
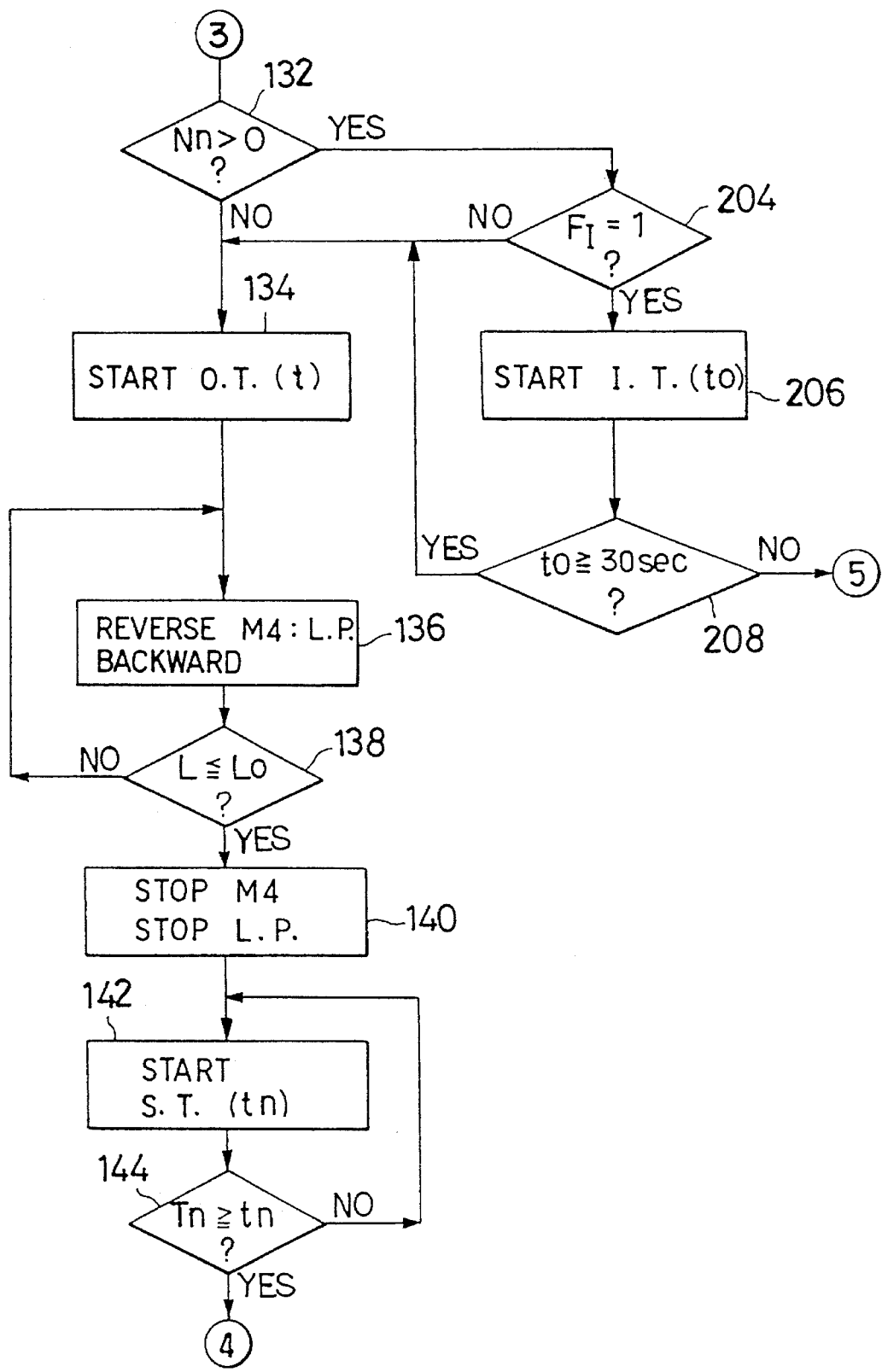
FIG. 8 is a flow chart associated with timers for the motor (M4)

Next, as shown in FIG. 7, at (126), the CPU (14) reads a time for keeping still the lumbar plate (26) which is selected by the selection switch (50). For example, if the selection switch is operated to select the switch position "0" then such time is set to be "0.2 sec." (see the Table 1), and the CPU (14) reads this information. The step flow is then led to the block (128) where it is determined whether or not the flag (FT3) is set to be "1" and if "YES" is given there, the time, 30 sec., is set in the operation timer (O.T.) at (13), and as shown in FIG. 8, at (132), it is determined whether the interval operation number value (Nn) is added any further numeral from zero "0", or not. In this case, no numeral is added thereto, and thus "NO" is answered at the block (132), so that the operation timer (t) starts to count the time as at (134). Then, at a block (136), the motor (M4) is driven in the reverse direction so as to cause the lumbar plate (26) to move backwardly from the original position (Ls). (see FIG. 3) With this reverse drive of motor (M4), the lumbar plate (26) is moved backward. When the lumbar position (L) reaches the backward reciprocation limit (Lo), it is determined at (138) whether the former (L) is less than the later (Lo) (i.e. L≦Lo), or not. The answer "NO" is kept given there until the lumbar plate (26) reaches the backward reciprocation limit (Lo), so that the motor (M4) continues its reverse drive. Then, when the lumbar plate (26) reaches that limit (Lo), providing the result " L≦Lo " the answer "YES" is given at (138) in FIG. 8, and as the motor (M4) stops, the lumbar plate (26) is stopped at the limit (Lo), whereupon a timer (S.T.) associated with the time for keeping still the lumbar plate (26) is started, 10 as at (142), and then it is checked on at (144) whether such time (tn), which has been set by the selection switch (50), is up, or not. At this block, "NO" is kept given until the value (tn) timed by the foregoing timer (S.T.) exceedes the given time (Tn). Then, when the value (tn) exceeds the time (Tn), "YES" is given at the block (144), the step flow is led to the block (146) in FIG. 9 wherein the timer (S.T.) is reset. Then, with the normal drive of motor (M4), the lumbar plate (26) is moved forwardly from the backward reciprocation limit (Lo), as indicated at (148) (see FIG. 3).

Figure 9:
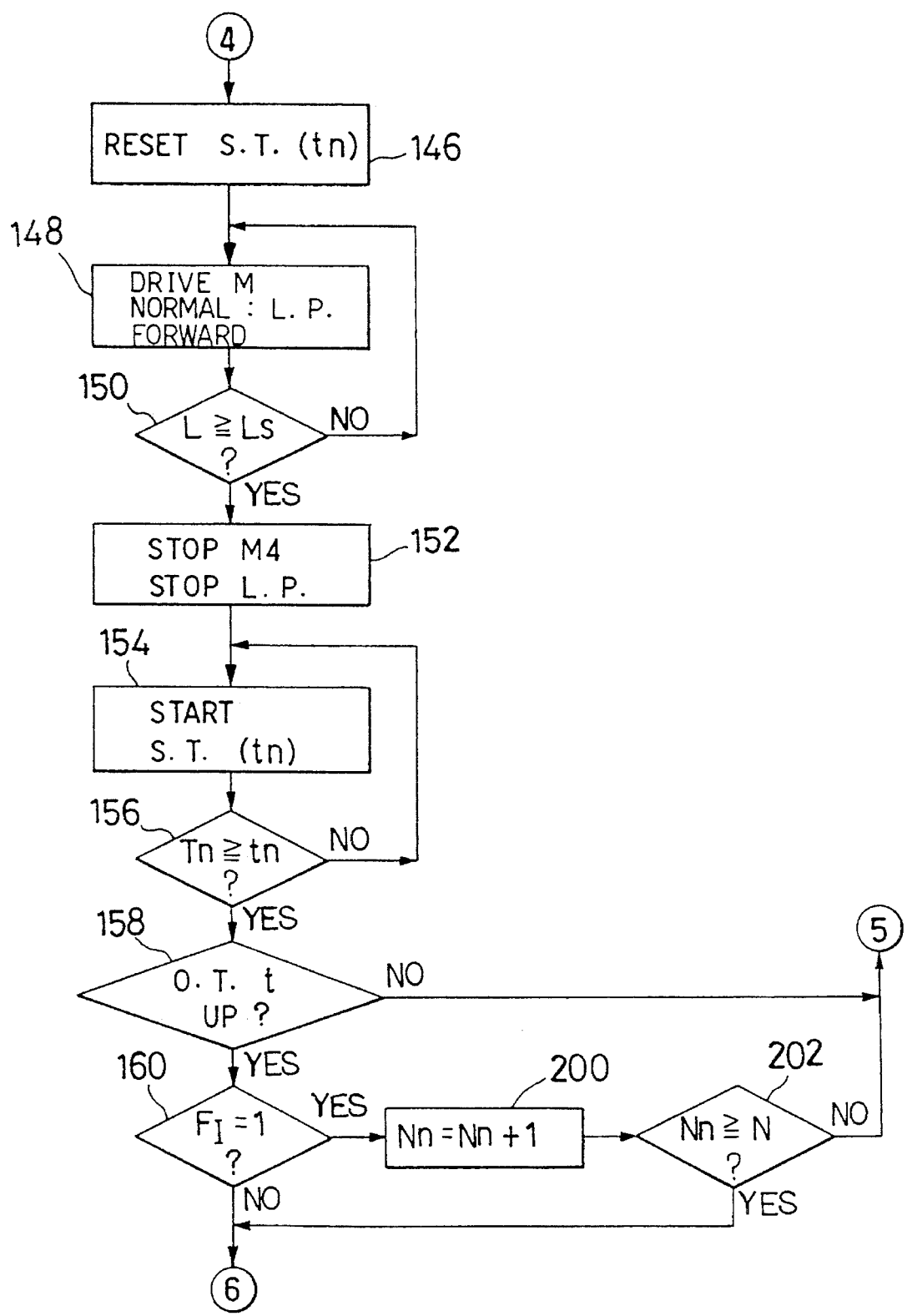
FIG. 9 is a flow chart forming one routine related to the lumbar plate reciprocation.

Next, as shown in FIG. 9, at (150), the CPU (14) makes a comparison between the lumbar position (L) and forward reciprocation limit (i.e. the original position (Ls)), and it is determined whether the lumbar plate (26) reaches the original position (Ls) to provide " L≦Ls ", or not. In this case, "NO" remains to be given there until the lumbar position (L) reaches the original position (Ls), thereby keeping the motor (M4) to drive in the normal direction. When the lumbar plate (26) reaches the original position (Ls) as in FIG. 3, "YES" is answered at (150) in FIG. 9, so that the motor (M4) is stopped and the lumbar plate (26) is stopped at that position (Ls) as indicated at (152). As a result, the timer (S.T.) is restarted to count the time (Tn) for keeping still the lumbar plate (26), at (154). It is determined at (156) whether or not the value (tn) timed by the timer (S.T.) reaches such time (Tn), and if "YES" is answered there as the time (Tn) is up, a determination is then made as to whether the operation timer (O.T.) completes counting the time (t), or not; namely, whether or not the operation time (T) exceeds the given time, 30 sec., at (158). In this way, the operation time (T) is checked up per one stroke of reciprocation of the lumbar plate (26). It is noted that, before the timer (O.T.) finishes counting the time (T), the block (158) gives "NO" decision, which returns the step flow to the block (104) in FIG. 5, thus restarting the above-described operations.

Next, assuming that the operation time (T) lapses 30 sec., one process of the lumbar plate reciprocation is completed, with the timer (O.T.) finishing counting the time (t), which gives "YES" in the block (158) in FIG. 9. Then, at (160), it is decided whether or not the flag (F1) for operation of the interval switch is set to "1"; namely, whether the interval switch (58) is operated or not. In this case, as the interval switch (28) is not operated, the answer is "NO" there. The step flow is then led to the block (162) in FIG. 10, wherein it is determined whether the lumbar (26) is located more forwardly than the original position (Ls), or not; namely whether or not the relation between the lumbar position (L) and that position (Ls) establishes " L–Ls≧0". If the lumbar plate (26) is located at the backward reciprocation limit (Lo) as in FIG. 3, the lumbar position (L) lies more backward than the position (Ls). This does not establish the foregoing relation "L–Ls≧0" and thus, " NO" is given in the block (162) in FIG. 10. Then, the motor (M4) is driven in the normal direction so as to cause the lumbar plate (26) to move toward the position (Ls) in the forward direction, as indicated at (164) (see FIG. 3). At (166) in FIG. 10, it is ascertained whether the lumbar plate (26) exceeds the position (Ls), or not; namely whether the relation " L–Ls >0" is established or not. Until the lumbar position (L) exceeds the position (Ls), the answer "NO" is kept given there, so that the motor (M4) continues its normal drive. Then, if "YES" is given at this block (166), the motor (M4) is stopped, and, at (168), the lumbar plate (26) is located at a position corresponding to the original position (Ls) (see FIG. 3). Consequently, the automatic LED indicator (52) lights on, as indicated at (170), and all the parameters (N, Nn, NI, NT3 and NT6) are initialized at (172), whereupon the 30-sec. reciprocation operation of lumbar plate (26) is completed.

Figure 10:
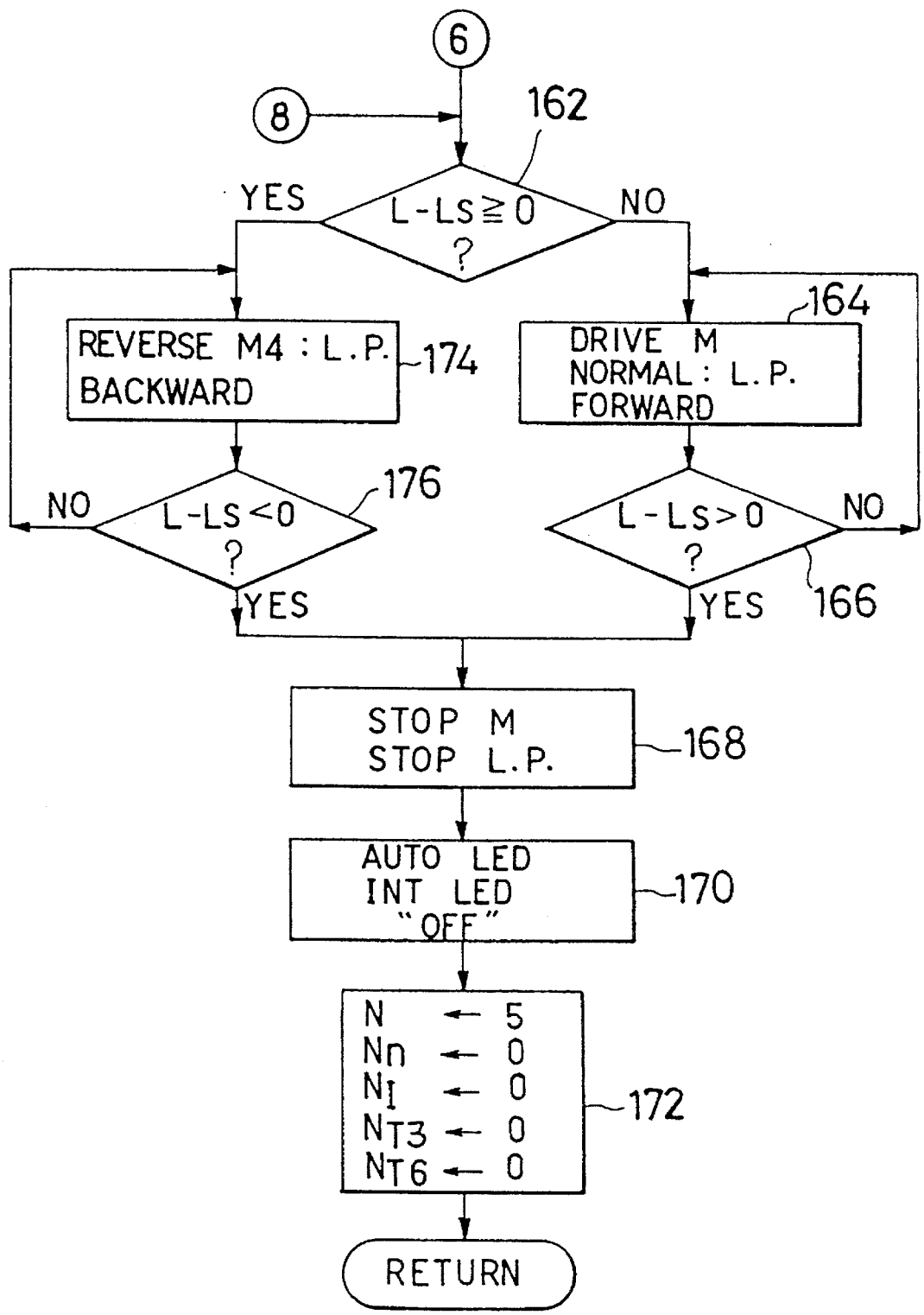
FIG. 10 is a flow chart for the control of the lumbar plate movement.

Assuming now that the lumbar plate (26) is located at or more forward than the original position (Ls) when the operation time (T) is up, the relation between the lumbar position (L) and position (Ls) establish "L−Ls≧0" and thus "YES" is given in the block (162) in FIG. 10. The step is led to the block (174) wherein the drive of motor (M4) is reversed to move the lumbar plate (26) backwardly. Then, it is determined at (176) whether the lumbar plate (26) moves past and more backwardly than the original position (Ls), (i.e. L−Ls<0), or not. If "YES" is given there, the motor (M4) is instructed to stop its drive and then the lumbar plate (26) is stopped at a position corresponding to the original position (Ls), at (168). Then, at (170), the automatic mode LED indicator (52) goes "off" and at (172), all the parameters (N, Nn, NI, NT3, and NT6) are initialized, so that the 30-sec. reciprocation operation is completed.

With this arrangement, it is possible to insure returning the lumbar plate (26) to the original position from any position where it is located.

At this point, before the operation time (T) is up, to operate again the 30-sec. reciprocation switch (46) will lead back the step flow to the block (110) for adding "1" to the operation value (NT3), in FIG. 5, so that the value (NT3) becomes "2". In that case, the next clock (112) is given "NO", and thus at (178) the flag (FT3) is reset to "0", leading the step flow to the block (180) in FIG. 6, wherein the motor (M4) is stopped to cease or suspend the reciprocation of lumbar plate (26). Then, in FIG. 10, the position of lumbar plate (26) is checked on and adjusted through the blocks (162), (164), (166), (174), and (176), so that the lumbar plate (26) is returned to a position corresponding to the original position (Ls). Thus, the switch (46) further has a function as a stop switch for stopping the on-going execution of the automatic control mode, and it is appreciated that even if the on-going automatic control operation is stopped, the lumbar plate (26) is returned to the original position (Ls) at the static fixed point for supporting the passenger's lumbar part, hence assuring his or her optimal, comfortable lumbar support force at any time.

On the other hand, assuming now that the 60-sec. reciprocation switch (48) is operated, the blocks (104) and (106) in FIG. 5 give "NO" decision. Then, at (108) in FIG. 6, "YES" is answered, and at the next block (182), number "1" is added to the operation value (NT6), as a result of which, since the value (NT6) is "1" the block (184) determines it to be an odd number, giving "YES" decision and the flag (FT6) is set to "1" at (186). The automatic mode LED indicator (54) lights on, as at (188). This is checked on at (118) in FIG. 5 and thereafter, with "YES" given there, at (122) and (124) in FIG. 7, the forward and backward reciprocation range of lumbar plate (26) is defined, and then, whether the flag (NT3) is set to "1" or not is determined at (128). As the flag (NT3) is in the reset state ("0") during this 60-sec. reciprocation operation, the block (128) gives "NO" answer and therefore the operation timer (O.T.) is set for 60 sec. time (t). Similarly to the above-described 30-sec. reciprocation operation, the motor (M4) keeps the repeated reversal drive to cause the fore-and-aft reciprocation of the lumbar plate (26) between the original position (Ls) and backward limit (Lo) (see FIG. 3). Then, the timer (O.T.) is up (i.e. after lapse of 60 sec.), "YES" is given at (158) in FIG. 9. As the interval switch flag (FI) is in the reset state, "NO" is answered at (160), thus leading the step flow to the blocks (162), (164), (166), (174) and (176) in FIG. 10, wherein the position of lumbar plate (26) is checked, adjusted and returned to a position corresponding to the original position (Ls). As a result, the automatic LED indicator (54) goes "off" at (170) and then, as indicated at (172), all the parameters (N, Nn, NI, NT3, NT6) are initialized, whereupon the 60-sec. reciprocation operation of lumbar plate (26) is completed.

In this respect, before the operation time (T) is up, to operate again the 60-sec. reciprocation switch (48) will lead the step flow to the block (182) in FIG. 6 for adding number "1" to the operation value (NT6) so that the value becomes "2". Then, the next block (184) determines it to be an odd number, giving "NO" decision there, with the result that the flag (FT6) is reset to "0" at (190) and the motor (M4) is stopped at (180). The step is led to the blocks (162), (164), (166), (174) and (176), through which the position of the lumbar plate (26) is checked on, adjusted and returned to a position corresponding to the original position (Ls).

Now, while the above-described 60-sec. reciprocation operation is being executed, if the 30-sec. reciprocation switch (46) is operated, then the step flow is returned to the block (106) in FIG. 5, at which "YES" is decided. Thus, at the next block (114), the flag (NT3) is set to "1" and "YES" is given at (128) in FIG. 7 to set the operation timer (O.T.) for 30 sec. as indicated at (130), whereupon the operation time is now changed from 60 sec. to 30 sec. Likewise, if the 60-sec. reciprocation switch (48) is operated during the foregoing 30-sec. operation, "NO" is decided at the block (106) in FIG. 5, which gives "YES" at (108) in FIG. 6, and the flag (FT6) is set to "1", leading thus the step to the block (128), with "NO" answered there, and the one (186) in FIG. 7, so that the operation time (T) is changed from 30 sec. to 60 sec.

Accordingly, it is seen that the operation time can be freely changed by merely operating one of the two automatic switches (i.e. 46, 48), which allows an operator to correct the operation time when he or she by mistake selects an undesired operation time.

With regard to the interval switch (58), if it is operated, the step flow begins with "YES" at (104) in FIG. 5 and then, the interval operation value (NI), which is set to be "0", is determined to be an odd number through the blocks (104), (192) and (194). Thus, the related flag (FI) is set to be "1" at (196), with the interval mode LED indicator (60) lighting on as at (198). At this point, an operator or passenger on the seat can operate one of the automatic switches (46, 48) to set one of the corresponding flags (FT3)(FT6). This is determined at the block (118), where, normally both two flags (FT3)(FT6) are in the reset state "0", giving "NO" answer. Therefore, if one of them is set to "1", the step flow is led, with "YES" answer, to the routine in FIG. 7. Let it be assumed, now, that the 30-sec. reciprocation switch (46) is operated to set the flag (FT3) to "1". "YES" is given at that block (118), leading the step to the block (120) in FIG. 7. In this block (120), the interval operation value (Nn), which remains to be "0", is naturally decided "0", thus answering "YES". Then, at (122) and (124), the fore-and-aft reciprocation limits of the lumbar plate (26) are defined. Thereafter, the 30-sec. reciprocation operation will be carried out as explained above, referring to FIGS. 4, 8 and 9. At the completion of one cycle of this operation with lapse of the operation time (T) at one time of operation (Nn=1), the block (158) in FIG. 9 gives "YES" and at (160), as the flag (FI) is set to the answer is "YES", leading the step to the block (200) for adding number "1" to the operation value (Nn). Then, the next block (202) determines whether the interval operation time (Nn) exceeds the given times "5" (i.e. Nn≧5), or not, in this particular embodiment. But, in this case, the value (Nn) is "1" and therefore "NO" is answered there, which returns the step flow to the block (104) in FIG. 5. Then, since the one cycle of operation has been completed, the step begins at (120) in FIG. 7. At this block, "NO" is decided, which leads the step directly to the block (132) in FIG. 8, jumping over all the blocks (122, 124) in FIG. 7. At that block (132), "YES" is answered, since the operation time (Nn) has been "1" as stated above. Then, at (204), "YES" is answered, for the flag (FI) has been set to "1". The interval timer (I.T.) starts to count time from "to" up to 30 sec. which is the interval of pause, as indicated at (206). It is ascertained at (208) whether the timer (I.T.) counts time in excess of 30 sec. , or not. Here, "NO" remains to be given until the time passes 30 sec. When "YES" is given at the block (208), the step again undergoes all the blocks (134) to (144) in FIG. 8 as well as the ones (146) to (156) in FIG. 9 , to execute the second cycle of 30-sec. lumbar plate reciprocation operation corresponding to the area (Nn=2) in FIG. 4. In this way, other remaining three cycles of operation will be done, with 30-sec. reciprocation operation of lumbar plate (26) and 30-sec. interval of pause, as can be seen from FIG. 4. Then, when all five cycles of operation (Nn=5) have been finished, with lapse of 30 sec., "YES" is given in each of blocks (158)(160) in FIG. 9 and at (200), the operation time value becomes "5", which therefore answers "YES" at (202). The step is led to the block (162) in FIG. 10, at which the position (L) of lumbar plate (26) is determined relative to the original position (Ls), and depending on it, the step undergoes the blocks (164)(166) or (174)(176), so that the lumbar plate (26) is returned to a position corresponding to the position (Ls). All subsequent operations will be effected as already explained through the blocks (168), (170) and (178), to complete the 30-sec. lumbar plate reciprocation operation in the interval operation mode.

In this interval operation mode, during the the automatic mode, operating again the interval switch (58, or I.S.W.) will bring the step back to the block (192) in FIG. 5 at which number "1" is added to the operation value (NI) so that the value (NI) becomes "2", namely, an odd number. Thus, "NO" is given at (194), and at the next block (210), the flag (FI) is reset to "0". Responsive thereto, the block (204) in FIG. 8 gives "NO" decision to avoid setting of the interval of pause at (206)(208). Thereafter, the reciprocation operation of lumbar plate (26) is effected along the steps through the blocks (134) to (144) in FIG. 8 as well as the ones (146) to (156) in FIG. 9. After lapse of operation time (T), when "YES" is decided at (158) in FIG. 9, the next block (160) gives "NO" answer, indicating the flag (FI) is reset to "0". Then, the steps undergo the blocks (162) to (176) in FIG. 10, so that the lumbar plate (26) is returned to a position corresponding to the original position (Ls).

While having described the present invention thus far, it should be finally understood that the invention is not limited to the illustrated embodiments but any other replacements, modifications and additions may be structurally applied thereto without departing from the scopes and spirits of the appended claims.

What is claimed is:

1. A device for controlling a lumbar support device in a powered seat, which includes a lumbar plate to support a lumbar part of an occupant sitting on said seat, said device comprising:

a motor for causing fore-and-aft movement of said lumbar plate;

a fore-and-aft switch means for controlling said motor under a manual control mode so as to adjust a forward reciprocation limit and a backward reciprocation limit of said lumbar plate within a fore-and-aft reciprocation range of said lumbar plate;

an automatic switch means for executing an automatic control mode for said lumbar plate;

a position detecting means for detecting the fore-and-aft position of said lumbar plate; and a central processing unit which processes an input data according to a predetermined program to control said motor;

wherein if said automatic control mode is executed by operation of said automatic switch means, said motor is subject to repeated reversal drive, and said lumbar plate is reciprocated forwardly and backwardly between said forward reciprocation limit and said backward reciprocation limit for a predetermined operation time in a periodic way, to thereby provide a dynamic or moving support to said lumbar portion of said occupant on the seat.

2. The device as defined in claim 1, wherein said device further includes a selection switch means for selecting a desired one of plurally preset times for keeping still said lumbar plate, and the device is so arranged as to stop said motor for said selected one of those times in the forward reciprocation limit and the backward reciprocation limit set for said lumbar plate.

3. The device as defined in claim 1, wherein said automatic switch means includes a plurality of switch means, each being operable to set respective number of preset times, and wherein, responsive to any of said plural switch means, a corresponding different one cycle of said operation time may be selected to effect said fore-and-aft reciprocation of said lumbar plate.

4. The device as defined in claim 3, wherein there are provided a predetermined number of automatic mode indicators which monitors said one cycle of the fore-and-aft reciprocation range of said lumber plate and on-going operation of said automatic mode.

5. The device as defined in claim 1, wherein there is provided an interval switch means as one of said automatic switch means, and wherein operation of said interval switch means causes execution of one cycle of fore-and-aft reciprocation of said lumbar plate with an interval of pause at a predetermined number of times continuously, thus carrying out an interval operation.

6. The device as defined in claim 5, wherein there is further provided an interval indicator which monitors said one cycle of said interval operation of said lumbar plate and continued performance of said interval operation.

7. The device as defined in claim 1, wherein said device further includes a motor for causing vertical movement of said lumbar plate and a switch means for effecting a manual control of said motor so as to adjust the vertical position of said lumbar plate.

8. A method for controlling a lumbar support device in a powered seat, in which a lumbar plate may be adjusted in position in a fore-and-aft direction with respect to the seat through control of drive of a motor, said method comprising the steps of:

manually controlling the drive of said motor when in a manual mode to adjustably set a desired position of said lumbar plate at a forward reciprocation to give a static or stationary support to a lumbar part of an occupant sitting on the seat under a predetermined lumbar support force; and thereafter manually controlling the drive of said motor when in said manual mode to adjustably set a backward limit of said lumbar plate within a backward limit point of said lumbar plate within a movable range thereof in the fore-and-aft direction; setting a backward reciprocation limit of said lumbar plate at a point occupying a certain ratio of a distance between said forward reciprocation limit and said backward limit;

automatically effecting a repeated reversal drive of said motor when in an automatic mode so as to cause fore-and-aft reciprocating motion of said lumbar plate between said forward reciprocation limit and said backward reciprocation limit for a predetermined period of time in a periodic manner, thereby providing a comfortable touch of dynamic or moving support to the lumbar part of said occupant sitting on the seat.

9. The method as defined in claim 8, wherein said backward reciprocation limit is set at a point slightly backward from said forward reciprocation limit when said certain ratio is at a value which reduces a lumbar support force of said lumbar plate so that the occupant does not feel the lumbar support touch.

10. The method as defined in claim 9, wherein the value of said ratio is about 60% of a distance in a forward direction from said backward limit.

11. The method defined in claim 8, further comprising the step of causing said motor to stop for a predetermined time, thereby producing a pause in the motion of said lumbar plate in each of said forward reciprocation limit and said backward reciprocation limit.

12. The method as defined in claim 11, further comprising a step for setting a plurality of different times to produce different pauses and wherein a desired one of the plurality of different times may be selected by operation of a selection switch.

13. The method as defined in claim 11, wherein the method further includes the step of permitting one of said plurality of different times to be freely selected by operation of said selection switch during execution of said automatic mode.

14. The method as defined in claim 8, wherein said method further includes the steps of:

detecting a position of said lumbar plate which is to be an original position, prior to execution of said automatic mode, by operation of an automatic switch;

setting said position to be a forward reciprocation limit;

storing said setting in memory;

counting out a backward position on basis of a distance between said forward reciprocation limit and a preset standard position; and setting said backward position to be a backward reciprocation limit.

15. The method as defined in claim 8, wherein there is provided an automatic switch for effecting said automatic mode, said automatic switch including an interval switch for effecting an interval operation which causes repeated reversal drive of said motor to provide one cycle of fore-and-aft reciprocation operation of said lumbar plate, with at least one interval of pause, during which the reciprocation of lumbar plate is to be effected at a predetermined number of times with said pause.

16. The method as defined in claim 8, wherein said method further includes the steps of:

permitting a position where said lumbar plate has been located prior to said automatic mode, said automatic mode being initiated by operation of an automatic switch;

then storing in memory a value thus detected as an original position;

after said automatic mode has been effected, making a comparison between a present position and said original position;

controlling the drive of said motor so as to automatically return said lumbar plate to a position corresponding to said original position.

17. A method for controlling a lumbar support device in a powered seat, in which a lumbar plate may be adjusted in position in a fore-and-aft direction with respect to the seat through control of drive of a motor, said method comprising the steps of:

manually controlling the drive of said motor when in a manual mode to adjustably set a desired position of said lumbar plate as a forward reciprocation limit of the same lumbar plate to give a static or stationary support to a lumbar part of an occupant sitting on the seat under a predetermined lumbar support force, and also manually controlling the drive of said motor when in said manual mode to adjustably set a backward limit of said lumbar plate within a movable range thereof in the fore-and-aft direction;

effecting a repeated reversal drive of said motor when in an automatic mode so as to cause fore-and-aft reciprocating motion of said lumbar plate between said forward reciprocation limit and backward reciprocation limit for a predetermined period of time in a periodic manner, thereby providing a comfortable touch of dynamic or moving support to the lumbar part of said occupant sitting on the seat; and permitting an interval operation mode for causing repeated reversal drive of said motor to provide one cycle of said fore-and-aft reciprocation motion of said lumbar plate, with at least one pause interval, during which the reciprocation of lumbar plate is to be effected at a predetermined number of times with said pause interval.

18. The method as defined in claim 17, wherein said automatic mode is executed by operation of an automatic switch.

19. The method as defined in claim 17, wherein said selection of a desired one out of said plurality of different times for effecting said one cycle of operation is permitted to be freely made by operation of an automatic switch even during execution of said automatic mode.

20. The method as defined in claim 17, wherein drive of said motor is effected at one cycle to provide one cycle of said lumbar plate reciprocation operation, wherein a plurality of different times for effecting said one cycle of operation are preset, and wherein said method includes permitting selection of a desired one out of said plurality of different times for effecting said one cycle of operation.

21. The method as defined in claim 17, wherein said interval operation may be suspended by turning off said interval switch during execution of said automatic mode.

* * * * *